(12) United States Patent
Woo

(10) Patent No.: US 12,337,810 B2
(45) Date of Patent: Jun. 24, 2025

(54) PARKING COLLISION AVOIDANCE SYSTEM AND CONTROL METHOD THEREOF

(71) Applicants: Hyundai Motor Company, Seoul (KR); Kia Corporation, Seoul (KR)

(72) Inventor: Hyeongmin Woo, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 367 days.

(21) Appl. No.: 17/838,786

(22) Filed: Jun. 13, 2022

(65) Prior Publication Data

US 2023/0020240 A1    Jan. 19, 2023

(30) Foreign Application Priority Data

Jul. 14, 2021    (KR) .......................... 10-2021-0091989

(51) Int. Cl.
| | | |
|---|---|---|
| *G06F 17/00* | (2019.01) | |
| *B60T 7/22* | (2006.01) | |
| *B60T 8/171* | (2006.01) | |
| *G06V 20/58* | (2022.01) | |

(52) U.S. Cl.
CPC ................ *B60T 7/22* (2013.01); *B60T 8/171* (2013.01); *G06V 20/58* (2022.01); *B60T 2201/10* (2013.01); *B60T 2210/20* (2013.01); *B60T 2210/32* (2013.01)

(58) Field of Classification Search
CPC ........ B60T 7/22; B60T 8/171; B60T 2201/10; B60T 2210/20; B60T 2210/32; B60T 2201/022; G06V 20/58; B60Q 9/005; B60Q 9/006; B60Q 9/008; B60W 30/08; B60W 10/18; B60W 40/02; B60W 2420/403; B60W 2420/54; B60W 2552/50; B60R 21/0134
USPC ............................................................. 701/96
See application file for complete search history.

(56) References Cited

U.S. PATENT DOCUMENTS

| | | | |
|---|---|---|---|
| 11,364,883 B2* | 6/2022 | Costin .................... | B60T 8/172 |
| 11,590,941 B2* | 2/2023 | Jung ....................... | G08G 1/166 |
| 11,644,834 B2* | 5/2023 | Ditty ..................... | G06F 15/7807 |
| | | | 701/23 |
| 11,891,036 B2* | 2/2024 | Costin .................... | B60T 8/172 |
| 2021/0300306 A1* | 9/2021 | Costin .................... | B60T 7/22 |
| 2022/0314942 A1* | 10/2022 | Costin .................... | B60T 7/22 |

FOREIGN PATENT DOCUMENTS

EP            0451593 A2  *  10/1991

OTHER PUBLICATIONS

Driver assistance systems_Audi (Year: 2017).*
Driver assistance systems_Audi (Year: 2017) (Year: 2017).*

* cited by examiner

*Primary Examiner* — Ronnie M Mancho
(74) *Attorney, Agent, or Firm* — Morgan, Lewis & Bockius LLP

(57) ABSTRACT

A parking collision avoidance system for a vehicle includes a sensing device configured to detect obstacles around the vehicle; and a control device that obtains type information of the obstacle and a point of expected collision timing with the obstacle according to sensing data received from the sensing device, determines a point of braking start timing of a braking device according to the point of the expected collision timing, and adjusts the point of the braking start timing according to the type information.

18 Claims, 9 Drawing Sheets

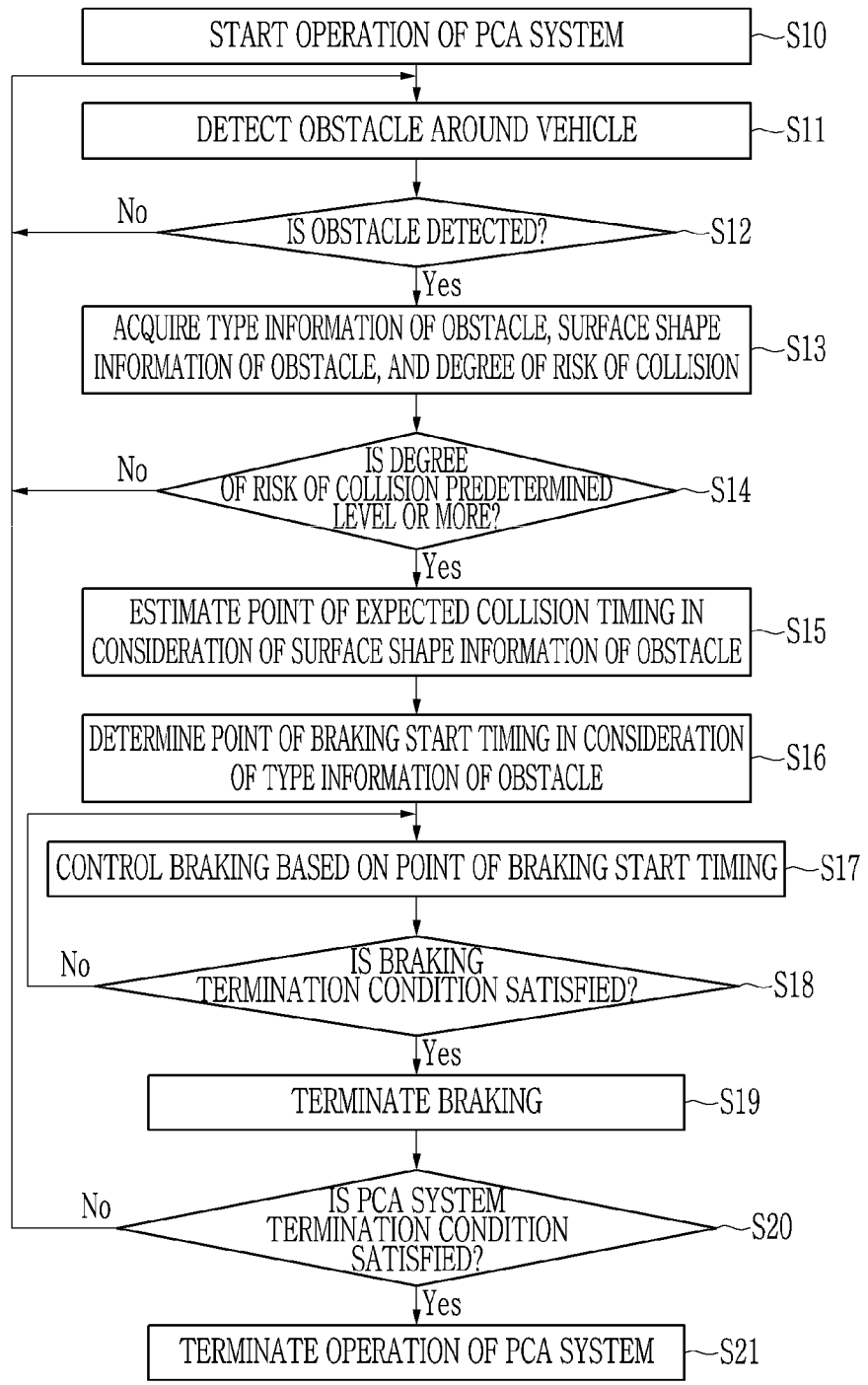

PARKING COLLISION AVOIDANCE SYSTEM AND CONTROL METHOD THEREOF

CROSS-REFERENCE TO RELATED APPLICATION

The present application claims priority to Korean Patent Application No. 10-2021-0091989 filed on Jul. 14, 2021, the entire contents of which is incorporated herein for all purposes by this reference.

BACKGROUND OF THE INVENTION

Field of the Invention

The present invention relates to a parking collision avoidance system and a control method thereof.

Description of Related Art

The parking collision avoidance (PCA) function is a function that predicts the timing of a collision between a vehicle and a surrounding obstacle while parking, and prevents a collision of the vehicle by operating the vehicle's braking control before the collision with the obstacle occurs.

Currently, the PCA system mounted on a vehicle frequently malfunctions due to a performance error of a sensor configured for detecting a collision, which causes inconvenience to a driver.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a parking collision avoidance system and a control method thereof including advantages of a reduced frequency of malfunctions.

Various aspects of the present invention are directed to providing a parking collision avoidance system for a vehicle. The parking collision avoidance system may include: a sensing device configured to detect obstacles around the vehicle; and a control device configured to obtain type information of each of the obstacles and a point of expected collision timing with the obstacle according to sensing data received from the sensing device, determine a point of braking start timing of a braking device according to the point of the expected collision timing, and adjust the point of the braking start timing according to the type information.

When the type information indicates that the obstacle is a person, the control device may adjust the point of the braking start timing so that the point of the braking start timing is shortened.

When the type information indicates that the obstacle is the person, the control device may correct a preset residual distance target value so that the residual distance target value increases by a predetermined value, and adjust the point of the braking start timing in response to the corrected residual distance target value. The residual distance target value may be a target value corresponding to a distance between the vehicle and the obstacle when the vehicle is stopped by the braking device.

The sensing device may include one or more cameras located in the vehicle. The control device may obtain the type information of the obstacle through image recognition for image data obtained through the one or more cameras.

The control device may obtain surface shape information of a surface of the obstacle facing the vehicle from the obstacle according to the sensing data, and adjust the point of the expected collision timing according to the surface shape information.

The control device may obtain distance information between the vehicle and the obstacle according to the sensing data, and estimate the point of the expected collision timing according to the distance information.

The control device may obtain location information of the obstacle according to the sensing data, correct the location information so that a location corresponding to the location information moves to a vehicle side when the surface shape information indicates a predetermined shape, and determine the distance information and the point of the expected collision timing according to the corrected location information.

The predetermined shape may correspond to a shape including an edge portion, or a non-uniformly curved shape.

The sensing device may include a plurality of ultrasonic sensors for obtaining a plurality of sensing data corresponding to a plurality of target points of the obstacle. The control device may determine locations of the plurality of target points according to the plurality of sensing data, and obtain the surface shape information by analyzing an arrangement pattern of the plurality of target points.

Various aspects of the present invention are directed to providing method of controlling a parking collision avoidance system. The control method may include: obtaining type information of an obstacle based on sensing data received from a sensing device that is configured to detect the obstacle around a vehicle; obtaining a point of expected collision timing with the obstacle according to the sensing data; determining a point of braking start timing of a braking device according to the point of the expected collision timing; adjusting the point of the braking start timing according to the type information; and controlling braking of the braking device based on the point of the braking start timing.

The adjusting of the point of the braking start timing may include adjusting the point of the braking start timing so that the point of the braking start timing is shortened, when the type information indicates that the obstacle is a person.

The adjusting of the point of the braking start timing so that the point of the braking start timing is shortened, when the type information indicates a person may include correcting a preset residual distance target value so that the residual distance target value increases by a predetermined value, and adjusting the point of the braking start timing in response to the corrected residual distance target value. The residual distance target value may be a target value corresponding to a distance between the vehicle and the obstacle when the vehicle is stopped by the braking device.

The sensing device may include one or more cameras located in the vehicle. The obtaining of the type information may include obtaining the type information of the obstacle through image recognition for image data obtained through the one or more cameras.

The obtaining of the point of the expected collision timing may include obtaining distance information between the vehicle and the obstacle according to the sensing data, and estimating the point of the expected collision timing based on the distance information.

The control method may further include obtaining surface shape information of a surface of the obstacle facing the vehicle from the obstacle according to the sensing data. The obtaining of the distance information may include adjusting the distance information according to the surface shape information.

The adjusting of the distance information may include obtaining location information of the obstacle according to the sensing data, correcting the location information so that a location corresponding to the location information moves to a vehicle side when the surface shape information indicates a predetermined shape, and adjusting the distance information according to the corrected location information.

The predetermined shape may correspond to a shape including an edge portion, or a non-uniformly curved shape.

The sensing device may include a plurality of ultrasonic sensors for obtaining a plurality of sensing data corresponding to a plurality of target points of the obstacle. The obtaining of the surface shape information may include determining locations of the plurality of target points according to the plurality of sensing data, and obtaining the surface shape information by analyzing an arrangement pattern of the plurality of target points.

According to various exemplary embodiments of the present invention, it is possible to reduce the number of malfunctions of the parking collision avoidance system, providing a parking collision avoidance system with improved reliability while minimizing the driver's sense of difference.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 schematically illustrates a method of controlling a parking collision avoidance system according to various exemplary embodiments of the present invention.

Figure 1:
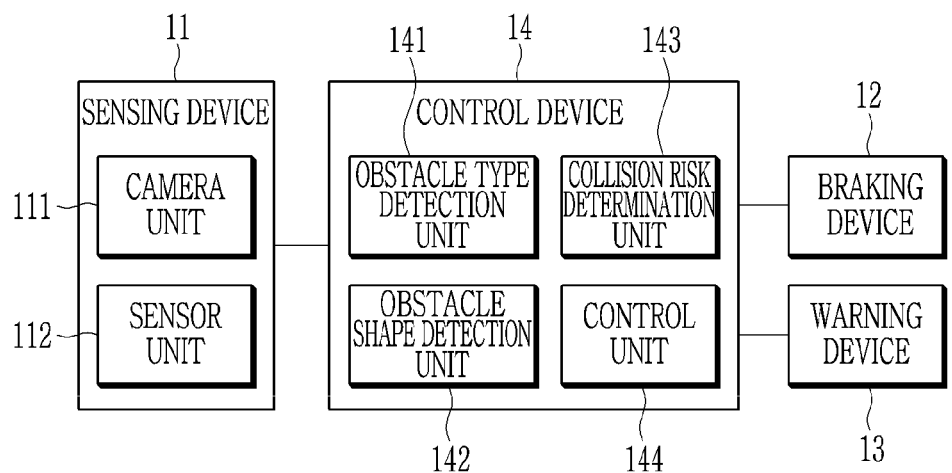
FIG. 1 illustrates a parking collision avoidance system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the exemplary embodiments disclosed in the exemplary embodiment will be described in detail with reference to the accompanying drawings, but identical or similar components are provided the same or similar reference numerals, and overlapping descriptions thereof will be omitted.

The suffixes "module" and/or "unit" for the components used in the following description are provided or mixed in consideration of only the ease of writing the specification, and do not have distinct meanings or roles by themselves. Furthermore, in describing the exemplary embodiments disclosed in the exemplary embodiment, when it is determined that detailed descriptions of related known technologies may obscure the gist of the exemplary embodiments disclosed in the exemplary embodiment, the detailed description thereof will be omitted. Furthermore, the accompanying drawings are only for easy understanding of the exemplary embodiments disclosed in the exemplary embodiment, and it should be understood that the technical idea disclosed in the exemplary embodiment of the present invention is not limited by the accompanying drawings, and includes all changes, equivalents and substitutes included in the spirit and scope of the present invention.

Terms including an ordinal number, such as first, second, and the like may be used to describe various components, but the components are not limited by the terms. The terms are used only for distinguishing one component from another component.

When a component is referred to as being "coupled" or "connected" to another component, it should be understood that one component may be directly coupled or connected to another component, but other components may exist between one component and another component. On the other hand, when one component is referred to as being "directly coupled to" or "directly connected to" another component, it should be understood that other components do not exist between one component and another component.

It should be understood that the terms "include" or "have" used in the exemplary embodiment, specify the presence of features, numerals, steps, operations, components, parts mentioned in the exemplary embodiment, or a combination thereof, but do not preclude the presence or addition of one or more other features, numerals, steps, operations, components, parts, or a combination thereof.

Furthermore, the terms such as "unit", "—er", "module", "means", and the like may mean a unit of processing one or more functions or operations, and may be implemented by hardware, software, or a combination of hardware and software.

FIG. 1 illustrates a parking collision avoidance system (PCA) for a vehicle according to various exemplary embodiments of the present invention.

Referring to FIG. 1, a PCA system 10 may include a sensing device 11, a braking device 12, a warning device 13, and a control device 14.

The sensing device 11 is a device configured for sensing obstacles around a vehicle, and may include a camera unit 111 and a sensor unit 112.

The camera unit 111 may include one or more cameras positioned in the vehicle. For example, the camera unit 111 may include cameras provided at the front, both sides, and rear of the vehicle to photograph the surroundings of the vehicle.

The sensor unit 112 may include one or more sensors mounted in the vehicle to obtain information related to the vehicle's surroundings. For example, the sensor unit 12 may include one or more sensors used to extract the information related to the vehicle's surrounds (presence and absence of surrounding objects, distance from surrounding objects, shape information of surrounding objects, etc.), such as a radar, a laser imaging detection and ranging (LIDAR), an ultrasonic sensor, and the like. The radar may transmit electromagnetic wave signals to the surroundings of the vehicle, and detect information related to the vehicle's surroundings according to signals that the transmitted electromagnetic wave signals are reflected and returned by surrounding objects (e.g., other vehicles). The LIDAR may transmit laser signals to the surroundings of the vehicle, and detect information related to the vehicle's surroundings according to signals that the transmitted laser signals are reflected and returned by surrounding objects (e.g., other vehicles). The ultrasonic sensor may transmit ultrasonic signals to the surroundings of the vehicle, and detect information related to the vehicle's surroundings according to signals that the transmitted ultrasonic signals are reflected and returned by surrounding objects (e.g., other vehicles).

The sensor unit 112 may further include one or more sensors for detecting a state of the vehicle. For example, the sensor unit 112 may include a vehicle speed sensor configured for detecting a vehicle speed of the vehicle.

The braking device 12, which is a device configured for braking the vehicle, may be used to decelerate or stop a driving vehicle or maintain the vehicle in a parked state.

The warning device 13, which is a device configured for outputting a warning signal to a driver, may include a display device that outputs a visual warning signal (e.g., a warning image, blinking, and the like) or an acoustic device that outputs an audible warning signal (e.g., a warning sound and the like).

The control device 14 may control an overall operation of the PCA system 10. The control device 14 may determine the degree of risk of collision with an obstacle located in the vicinity of the vehicle and a point of expected collision timing based on detected data obtained through the sensing device 11. When it is determined that the degree of risk of collision with the obstacle is high, the control device 14 may output a warning signal for warning of the risk of collision through the warning device 12. Furthermore, when it is determined that the degree of risk of collision with the obstacle is high, the control device 14 may determine a point of braking start timing for avoiding a collision based on the point of the expected collision timing, and control the braking device 12 based on the determined point of expected collision timing, reducing a traveling speed of the vehicle.

In an exemplary embodiment of the present invention, it is determined that the degree of risk of collision with the obstacle is high, when the degree of risk of collision is higher than a predetermined degree of risk.

The control device 14 may also obtain obstacle information including type information, surface shape information, and the like of obstacles located around the vehicle based on the detected data (image data and sensor data) obtained through the sensing device 11. When the obstacle information is obtained, the control device 14 may also adjust a control parameter used to control the braking device 12 for collision avoidance based on the obtained obstacle information.

To perform the above-described functions, the control device 14 may include an obstacle type detection unit 141, an obstacle shape detection unit 142, a collision risk determination unit 143, and a control unit 144.

The obstacle type detection unit 141 may receive image data captured around the vehicle from the camera unit 111 of the sensing device 11. The obstacle type detection unit 141 may detect obstacles located around the vehicle and identify a type of detected obstacle (vehicle, person, structure, and the like), through image recognition processing for the image data received from the camera unit 111. When the type of obstacle is identified, the obstacle type detection unit 141 may output obstacle identification information including information on the identified type of obstacle to the collision risk determination unit 143.

The obstacle shape detection unit 142 may receive sensor data (e.g., sensor data output from an ultrasonic sensor) detected for the obstacle around the vehicle from the sensor unit 112 of the sensing device 11, and may perform signal processing such as noise filtering on the received sensor data. The obstacle shape detection unit 142 may obtain surface shape information of obstacles located around the vehicle based on the signal-processed sensor data.

FIG. 2A, FIG. 2B, FIG. 2C, and FIG. 2D illustrate examples in which the obstacle shape detection unit 142 obtains surface shape information of an obstacle.

Referring to FIG. 2A, FIG. 2B, FIG. 2C, and FIG. 2D, a plurality of ultrasonic sensors 21 for detecting obstacles around the vehicle may be positioned to be spaced from each other in the vehicle. Each ultrasonic sensor 21 may transmit an ultrasonic signal to the surroundings of the vehicle, and may output sensor data in response to a signal that the transmitted ultrasonic signal is reflected and returned by the obstacle. Accordingly, the plurality of ultrasonic sensors 21 spaced from each other may obtain the sensor data for a plurality of different target points tp on the obstacle, as illustrated in FIG. 2A, FIG. 2B, FIG. 2C, and FIG. 2D.

When the sensor data corresponding to the different target points tp of the obstacle is received through the ultrasonic sensors 21, the obstacle shape detection unit 142 may obtain location information of each target point tp from the received sensor data. When the location information of the target points tp is obtained, the obstacle shape detection unit 142 may map the target points tp to a virtual coordinate space based on the obtained location information. Accordingly, the obstacle shape detection unit 142 may analyze arrangement patterns of the target points tp mapped to the virtual coordinate space to estimate a surface shape of the obstacle corresponding to the arrangement patterns. For example, the obstacle shape detection unit 142 may generate a virtual line connecting neighboring target points tp to each other, and estimate the surface shape information of the obstacle based on inclination information of the generated virtual line.

Figure 2A:
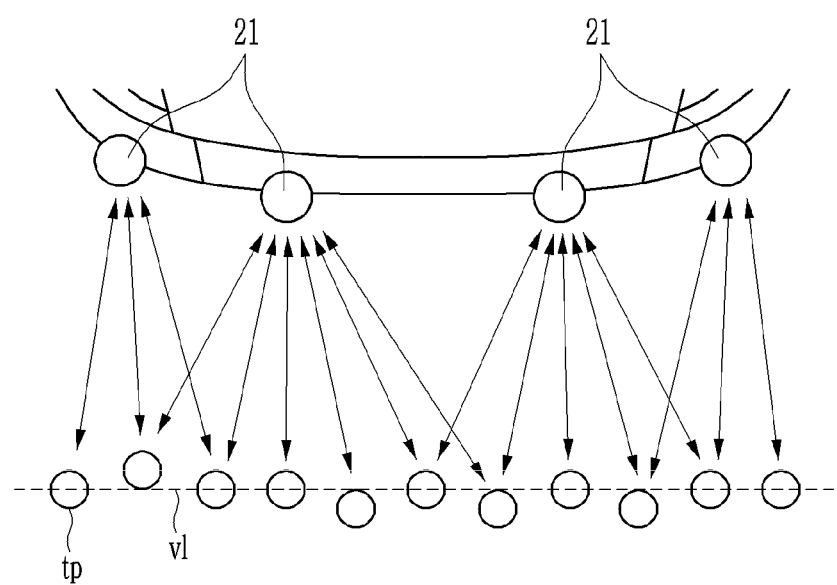
FIG. 2A, FIG. 2B, FIG. 2C, and FIG. 2D illustrate examples of obtaining surface shape information of an obstacle in the parking collision avoidance system according to various exemplary embodiments of the present invention.

For example, referring to FIG. 2A, a virtual line vl connecting the target points tp has very little change in inclination to form an approximate straight line. In the instant case, the obstacle shape detection unit 142 may determine that a surface of the corresponding obstacle facing the vehicle has a planar shape.

Figure 2B:
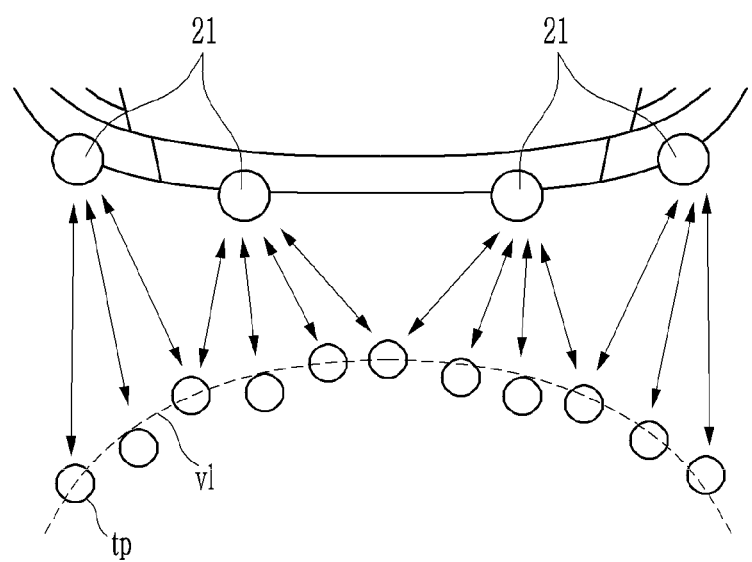

For example, referring to FIG. 2B, a virtual line vl connecting the target points tp forms a round in which a change in inclination is constant. In the instant case, the obstacle shape detection unit 142 may determine that a surface of the corresponding obstacle facing the vehicle has a curved shape.

Figure 2C:
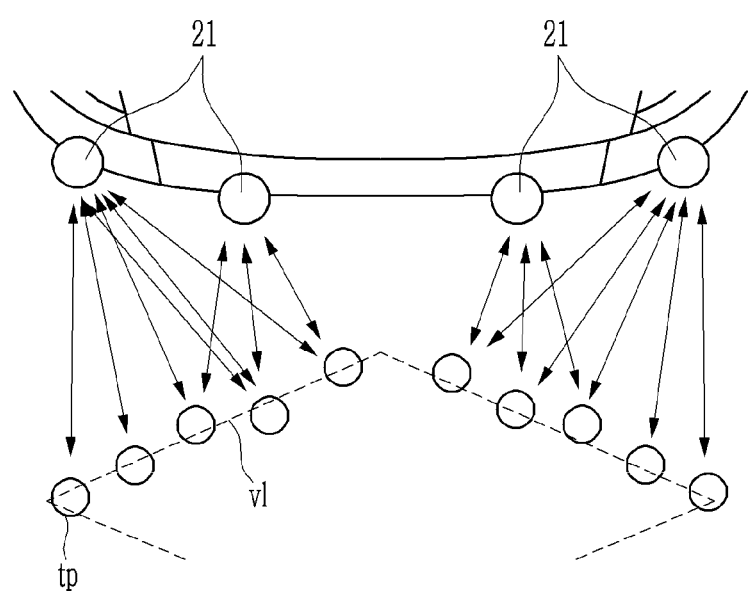

For example, referring to FIG. 2C, a virtual line vl connecting the target points tp includes a section in which a change amount of inclination is a predetermined value or more. In the instant case, the obstacle shape detection unit 142 may determine that the corresponding obstacle has a shape in which an edge portion is formed on a surface facing the vehicle.

Figure 2D:
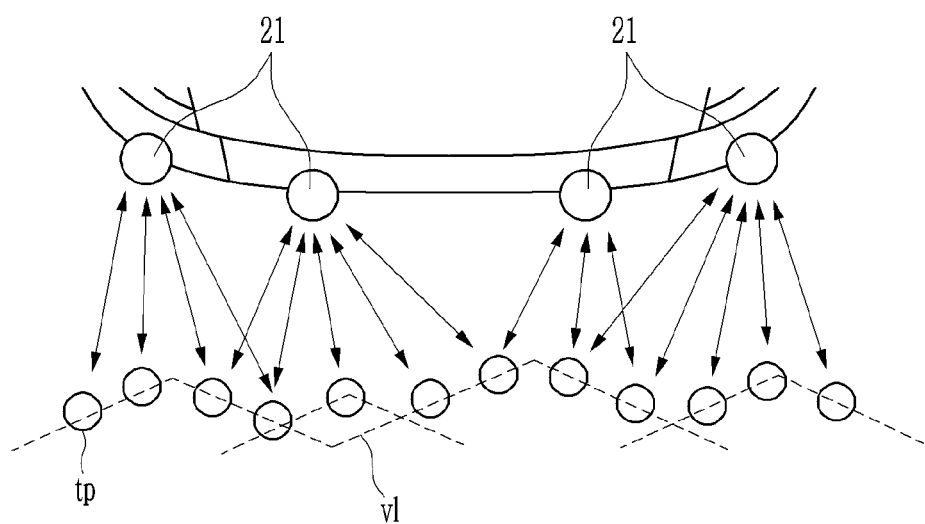

For example, referring to FIG. 2D, a virtual line vl connecting the target points tp has irregularly changing inclination. In the instant case, the obstacle shape detection unit 142 may determine that it is impossible to determine a surface shape of the corresponding obstacle.

Referring back to FIG. 1, when the surface shape information of the obstacle is obtained in the above-described manner, the obstacle shape detection unit 142 may output the surface shape information of the obstacle to the collision risk determination unit 143.

The collision risk determination unit 143 may receive the detected data (image data and sensor data) from the sensing device 11, and obtain location information (e.g., distance information from the vehicle) of an obstacle located around the vehicle based on the detected data. The collision risk determination unit 143 may determine the degree of risk of collision with the obstacle based on the location information of the obstacle around the vehicle. For example, the collision risk determination unit 143 may determine the degree of risk of collision based on the distance between the vehicle and the obstacle, and determine that the closer the distance between the vehicle and the obstacle, the higher the degree of risk of collision.

When it is determined that the degree of risk of collision with the obstacle is higher than a predetermined level, the collision risk determination unit 143 may estimate a point of expected collision timing with the corresponding obstacle based on a current traveling direction of the vehicle, a vehicle speed (or a relative speed with respect to the obstacle), a distance between the vehicle and the obstacle, and the like.

A sensor used to detect location information of the obstacle, such as the ultrasonic sensor 21, may have a performance error. When the surface of the obstacle has an edge shape or the surface of the obstacle has an unevenly curved shape, the performance error of the sensor may further increase due to diffused reflection. The performance error of the sensor may act as a cause of malfunction of the PCA system 10.

To reduce such a malfunction, the collision risk determination unit 143 may adjust the point of the expected collision timing with the obstacle based on the surface shape information of the obstacle.

Figure 3:
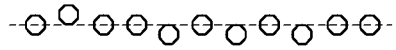
FIG. 3 is a view for explaining a method of adjusting a point of expected collision timing according to the surface shape information of the obstacle in the parking collision avoidance system according to various exemplary embodiments of the present invention.

FIG. 3 is a view for explaining a method in which the collision risk determination unit 143 adjusts a point of expected collision timing according to the surface shape information of the obstacle.

Referring to FIG. 3, when the shape information of the obstacle indicates the planar shape, the collision risk determination unit 143 may generate a virtual straight line 31 corresponding to an arrangement of target points (see tp in FIG. 2A) detected by the obstacle shape detection unit 142 in a virtual coordinate space. Accordingly, the collision risk determination unit 143 may determine a distance between the vehicle and the obstacle based on the generated virtual straight line 31, and estimate a point of expected collision timing based on the determined distance.

When the shape information of the obstacle indicates the curved shape, the collision risk determination unit 143 may generate a virtual round 32 corresponding to an arrangement of target points (see tp in FIG. 2B) detected by the obstacle shape detection unit 142 in a virtual coordinate space. Accordingly, the collision risk determination unit 143 may determine a distance between the vehicle and the obstacle based on the generated virtual round 32, and estimate a point of expected collision timing based on the determined distance.

When the surface shape information of the obstacle indicates an edge shape protruding toward a vehicle side, the collision risk determination unit 143 may generate a virtual target point 33 corresponding to a vertex of an edge portion based on an arrangement of target points (see to tp in FIG. 2C) detected by the obstacle shape detection unit 142 in a virtual coordinate space. Accordingly, the collision risk determination unit 143 may determine a distance between the vehicle and the obstacle based on the generated virtual target point 33, and estimate a point of expected collision timing based on the determined distance. In the instant case, because the added virtual target point 33 is located to protrude toward the vehicle side compared to other target points, the distance between the vehicle and the obstacle is reduced when distance information between the vehicle and the obstacle is obtained based on the added virtual target point. Accordingly, due to the reduced distance information, the point of the expected collision timing is also reduced, and the point of the braking start timing determined based on the point of the expected collision timing is also shortened. Accordingly, because it is possible to secure a sufficient safe distance between the vehicle and the obstacle during braking, it is possible to avoid a situation in which the vehicle and the obstacle collide, which occurs because it is difficult to accurately detect an edge region due to the performance error of the sensor on the edge portion.

When the shape information of the obstacle indicates the shape which may not be determined, the collision risk determination unit 143 may generate a virtual line 34 at a location advanced to the vehicle side from the target points (see tp in FIG. 2C) detected by the obstacle shape detection unit 142 in a virtual coordinate space. For example, the collision risk determination unit 143 may generate the virtual line 34 at a location spaced apart with a predetermined distance from a point located closest to the vehicle side among the target points. Accordingly, the collision risk determination unit 143 may determine a distance between the vehicle and the obstacle based on the generated virtual line 34, and estimate a point of expected collision timing based on the determined distance. In the instant case, because the virtual line 34 is closer to the vehicle side than the actual locations of the target points, the distance between the vehicle and the obstacle is reduced when distance information between the vehicle and the obstacle is obtained based on the virtual line 34. Accordingly, due to the reduced distance information, the point of the expected collision timing is also reduced, and the point of the braking start timing determined based on the point of the expected collision timing is also shortened. Accordingly, because it is possible to secure a sufficient safe distance between the vehicle and the obstacle during braking, it is possible to avoid a situation in which the vehicle and the obstacle collide, which is caused by an error occurring in sensor performance due to diffused reflection on a non-uniform surface.

Referring back to FIG. 1, when the degree of risk of collision and the point of the expected collision timing are estimated, the collision risk determination unit 143 transmits the estimated degree of risk of collision and point of expected collision timing to the control unit 144.

When the degree of risk of collision received from the collision risk determination unit 143 is a predetermined level or more, the control unit 144 may control the warning device 13 to output a warning signal.

The control unit 144 may also determine a point of braking start timing of the braking device 12 for collision avoidance based on the point of the expected collision timing and a residual distance target value received from the collision risk determination unit 143. The residual distance target value indicates a target value corresponding to a distance between the vehicle and the obstacle when the vehicle is completely stopped by braking. The control unit 144 may determine a point of braking start timing for starting braking of the vehicle so that the vehicle may stop at a distance from an obstacle corresponding to the residual distance target value. The magnitude of a braking force applied to the vehicle when the braking device 12 is operated for collision avoidance in the PCA system 10 may be preset in a production stage or a calibration stage of the vehicle. Furthermore, a current speed of the vehicle that affects braking of the vehicle may be obtained through the sensor unit 112. Accordingly, when the braking force which is set using the magnitude of braking force and the current speed of the vehicle is applied, the control unit 144 may estimate the time (braking control time) it takes for the vehicle to stop and a moving distance (braking distance). The collision risk determination unit 143 may also obtain a point of braking start timing for satisfying the residual distance target value based on the braking control time and the braking distance.

The control unit 144 may adjust the point of the braking start timing by adjusting the residual distance target value for collision avoidance according to an obstacle type.

Figure 4A:
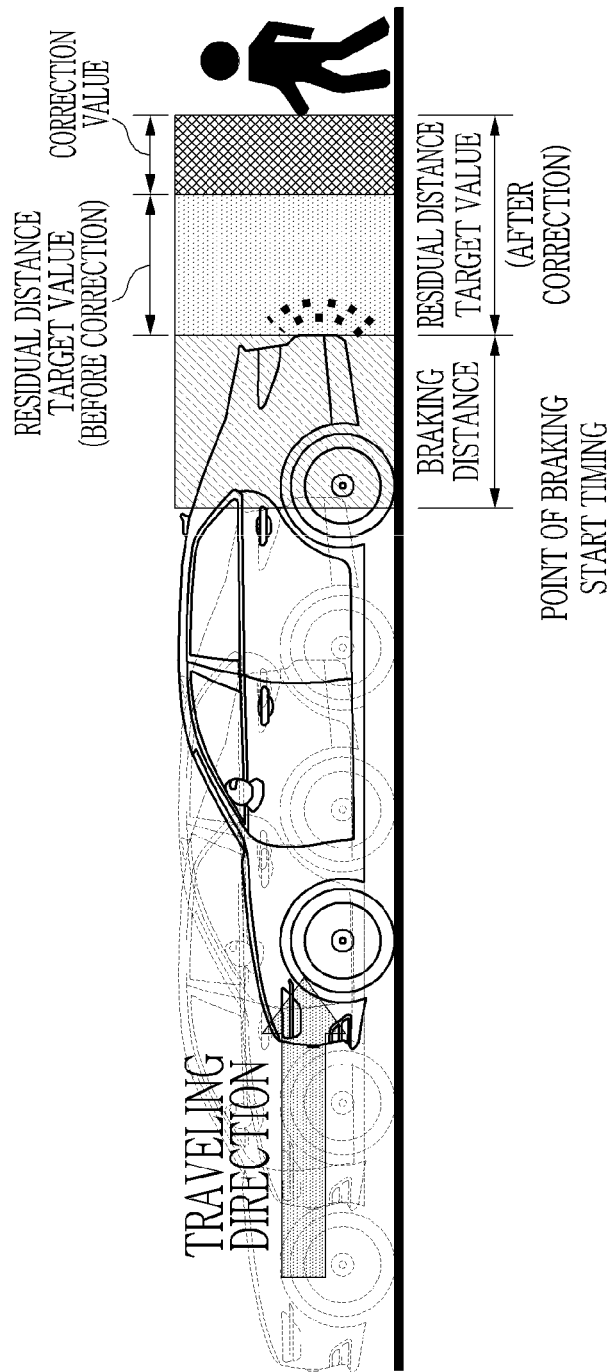
FIG. 4A and FIG. 4B illustrate examples of differently applying a point of braking start timing for collision avoidance according to an obstacle type in the parking collision avoidance system according to various exemplary embodiments of the present invention.
Figure 4B:
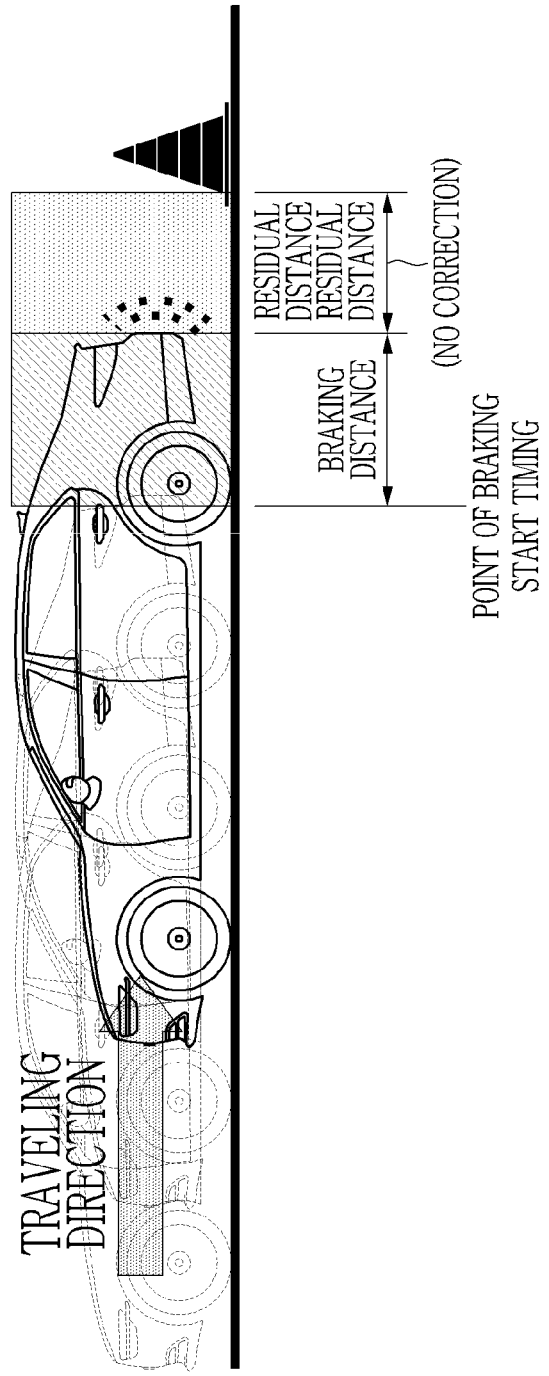

FIG. 4A and FIG. 4B illustrate examples in which the control unit 144 differently applies a point of braking start timing for collision avoidance according to an obstacle type.

For example, referring to FIG. 4A, when the obstacle is a person, the control unit 144 may correct the residual distance target value by increasing a preset residual distance target value by a predetermined value to minimize a possibility of colliding with the person due to a performance error of the sensor, and determine a point of braking start timing based on the corrected residual distance target value. In the instant case, to secure a residual distance by the added distance, the point of the braking start timing may be shortened.

For example, referring to FIG. 4B, when the obstacle is a fixed object such as a structure or stationary vehicle, the control unit 144 may use the residual distance target value, which is set to a default, as it is. When increasing the residual distance target value for the fixed object as in the case of the person, a situation in which the vehicle is braked at an unnecessary point of timing may occur, which may cause the driver's sense of heterogeneity.

As described above, by varying the point of the braking start timing according to the type of obstacle, the control unit 144 may minimize the possibility of a collision and prevent unnecessary braking of the vehicle, reducing the driver's sense of heterogeneity.

Referring back to FIG. 1, when the point of the braking start timing is determined, the control unit 144 may control the braking device 12 to start braking at the determined point of braking start timing. The control unit 144 may directly control the braking device 12 to start braking based on the point of the braking start timing, or may transmit the point of the braking start timing to a separate control device so that the braking device is controlled by the separate control device.

The above-described control device 14 includes at least one electronic control unit (ECU) mounted in the vehicle, and the obstacle type detection unit 141, the obstacle shape detection unit 142, the collision risk determination unit 143, and the control unit 144 may be implemented by at least one electronic control unit included in the control device 14.

Hereinafter, a method of controlling a PCA system according to an exemplary embodiment will be described in detail with reference to FIG. 5.

FIG. 5 schematically illustrates a method of controlling the PCA system 10 according to various exemplary embodiments of the present invention. The control method of FIG. 5 is performed by the control device 14 of the PCA system 10 described with reference to FIG. 1.

Referring to FIG. 5, as the PCA system 10 starts an operation (S10), the control device 14 may receive sensing data about the surroundings of the vehicle from the sensing device 11 and try to detect an obstacle around the vehicle using the received sensing data (S11).

If the obstacle is detected around the vehicle (S12), the control device 14 may obtain type information and surface shape information of the detected obstacle, and the degree of risk of collision with the obstacle according to the sensing data received from the sensing device 11 (S13).

In the step S13, the control device 14 may receive image data photographing the obstacle from the camera unit 111, and obtain information on the type of obstacle (e.g., a person, a vehicle, a structure, and the like) through image recognition processing on the received image data.

In the step S13, the control device 14 may receive sensor data obtained about the surroundings of the vehicle from the sensor unit 111, and obtain surface shape information on a surface of the obstacle facing the vehicle based on the received sensor data. For example, the control device 14 may receive sensor data obtained for different target points of an obstacle from a plurality of ultrasonic sensors located in the vehicle, and obtain surface shape information of the obstacle by analyzing an arrangement pattern of the target points based on the received sensor data.

In the step S13, the control device 14 may determine the degree of risk of collision between the vehicle and the obstacle based on a distance between the detected obstacle and the vehicle, a current speed of the vehicle, a traveling direction of the vehicle, and the like.

If the degree of risk of collision between the vehicle and the obstacle is a predetermined level or more (S14), the control device 14 may estimate a point of expected collision timing of the vehicle in consideration of the surface shape information of the corresponding obstacle (S15).

In the step S15, the control device 14 may correct a position of the obstacle used for determining distance information by moving the position to a vehicle side, for obstacles with surface shapes that are likely to cause an error in sensor performance, such as an edge shape and a non-uniform shape. Accordingly, the control device 14 may obtain distance information from the vehicle based on the corrected position of the obstacle, and estimate a point of expected collision timing based on the obtained distance information.

The control device 14 may determine a point of braking start timing at which to start braking of the braking device 12 for collision avoidance based on the point of the expected collision timing in consideration of the type information of the obstacle (S16).

In the step S16, the control device 14 may increase a preset residual distance target value by a predetermined value for a type of obstacle which may cause a collision due to difficult prediction of movement, such as a person, and determine the point of the braking start timing based on the increased residual distance target value. In the instant case, because the vehicle needs to be braked at a distance away from the obstacle by the increased residual distance target value, the point of the braking start timing is substantially shortened.

When the point of the braking start timing is determined, the control device 14 may control the braking of the braking device 12 of the vehicle based on the determined point of braking start timing (S17). Thereafter, if a braking termination condition is satisfied (S18), the control device 14 may control the braking of the vehicle to be terminated (S19). For example, when the obstacle moves away from the vehicle, the control device 14 may terminate the braking of the vehicle.

Steps S11 to S19 described above may be repeatedly performed until the termination condition of the PCA system 10 is satisfied and the operation of the PCA system 10 is terminated (S21).

The method of controlling the PCA system according to the above-described embodiment may be executed through software. When executed in software, the constituent means of the present invention are code segments that execute the necessary tasks. The program or code segments may be stored on a processor-readable medium or transmitted by a computer data signal coupled with a carrier wave in a transmission medium or a communication network.

The computer-readable recording medium includes all types of recording devices in which data readable by a computer system is stored. Examples of the computer-readable recording medium include ROM, RAM, CD-ROM, DVD_ROM, DVD_RAM, magnetic tape, floppy disk, hard disk, and optical data non-transitory storage device. Furthermore, the computer-readable recording medium is distributed in network-connected computer devices so that computer-readable codes may be stored and executed in a distributed manner.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A parking collision avoidance system for a vehicle, the parking collision avoidance system comprising:
   a sensing device configured to detect obstacles around the vehicle; and
   a control device configured to obtain type information of an obstacle and a time of expected collision with the obstacle according to sensing data received from the sensing device, determine a start time of a braking device according to the time of the expected collision, and adjust the start time of the braking according to the type information,
   wherein when the type information indicates that the obstacle is a person, the control device is further configured to adjust the start time of the braking so that a braking distance to the person is shorter compared to a braking distance when the obstacle is not the person.

2. The parking collision avoidance system of claim 1,
   wherein when the type information indicates that the obstacle is the person, the control device is further configured to correct a preset residual distance target value so that the residual distance target value increases by a predetermined value, and adjust the start time of the braking in response to the corrected residual distance target value, and
   wherein the residual distance target value is a target value corresponding to a distance between the vehicle and the obstacle when the vehicle is stopped by the braking device.

3. The parking collision avoidance system of claim 1,
   wherein the sensing device includes one or more cameras located in the vehicle, and
   wherein the control device is further configured to obtain the type information of the obstacle through image recognition for image data obtained through the one or more cameras.

4. The parking collision avoidance system of claim 1, wherein the control device is further configured to obtain surface shape information of a surface of the obstacle facing the vehicle from the obstacle according to the sensing data, and adjust the time of the expected collision according to the surface shape information.

5. The parking collision avoidance system of claim 4, wherein the control device is further configured to obtain distance information between the vehicle and the obstacle according to the sensing data, and estimate the time of the expected collision according to the distance information.

6. The parking collision avoidance system of claim 5, wherein the control device is further configured to obtain location information of the obstacle according to the sensing data, correct the location information by moving a location of the obstacle corresponding to the location information to a vehicle side when the surface shape information indicates a predetermined shape, and determine the distance information and the time of the expected collision according to the corrected location information.

7. The parking collision avoidance system of claim 6, wherein the predetermined shape corresponds to a shape including an edge portion, or a non-uniformly curved shape.

8. The parking collision avoidance system of claim 4,
wherein the sensing device includes a plurality of ultrasonic sensors for obtaining a plurality of sensing data corresponding to a plurality of target points of the obstacle, and
wherein the control device is further configured to determine locations of the plurality of target points according to the plurality of sensing data, and obtain the surface shape information by analyzing an arrangement pattern of the plurality of target points.

9. The parking collision avoidance system of claim 8,
wherein the control device is configured to generate a virtual line connecting neighboring target points among the target points to each other, and determine a shape of the obstacle according to a change in inclination in the virtual line connecting the neighboring target points.

10. A method of controlling a parking collision avoidance system, the control method comprising:
obtaining, by a controller, type information of an obstacle and a time of expected collision with the obstacle according to sensing data received from a sensing device that is configured to detect the obstacle around a vehicle;
determining, by the controller, a start time of a braking device according to the time of the expected collision;
adjusting, by the controller, the start time of the braking according to the type information; and
controlling, by the controller, braking of the braking device based on the start time of the braking,
wherein the adjusting of the start time of the braking includes adjusting the start time of the braking so that a braking distance to the person is shorter compared to a braking distance when the obstacle is not the person.

11. The method of claim 10,
wherein the adjusting of the start time of the braking so that the start time of the braking is shortened, when the type information indicates the person includes:
correcting a preset residual distance target value so that the residual distance target value increases by a predetermined value, and
adjusting the start time of the braking in response to the corrected residual distance target value, and
wherein the residual distance target value is a target value corresponding to a distance between the vehicle and the obstacle when the vehicle is stopped by the braking device.

12. The method of claim 10,
wherein the sensing device includes one or more cameras located in the vehicle, and
wherein the obtaining of the type information includes obtaining the type information of the obstacle through image recognition for image data obtained through the one or more cameras.

13. The method of claim 10, wherein the obtaining of the time of the expected collision includes:
obtaining distance information between the vehicle and the obstacle according to the sensing data, and
estimating the time of the expected collision based on the distance information.

14. The method of claim 13, further including:
obtaining, by the controller, surface shape information of a surface of the obstacle facing the vehicle from the obstacle according to the sensing data,
wherein the obtaining of the distance information includes adjusting the distance information according to the surface shape information.

15. The method of claim 14, wherein the adjusting of the distance information includes:
obtaining location information of the obstacle according to the sensing data,
correcting the location information by moving a location of the obstacle corresponding to the location information to a vehicle side when the surface shape information indicates a predetermined shape, and
adjusting the distance information according to the corrected location information.

16. The method of claim 15, wherein the predetermined shape corresponds to a shape including an edge portion, or a non-uniformly curved shape.

17. The method of claim 14,
wherein the sensing device includes a plurality of ultrasonic sensors for obtaining a plurality of sensing data corresponding to a plurality of target points of the obstacle, and
wherein the obtaining of the surface shape information includes:
determining locations of the plurality of target points according to the plurality of sensing data, and
obtaining the surface shape information by analyzing an arrangement pattern of the plurality of target points.

18. The method of claim 17, wherein control device is configured to generate a virtual line connecting neighboring target points among the target points to each other, and determine a shape of the obstacle according to a change in inclination in the virtual line connecting the neighboring target points.

* * * * *